United States Patent [19]

Lipcon

[11] 4,384,363
[45] May 17, 1983

[54] TRANSCEIVER FOR LOCAL NETWORK USING CARRIER-SENSE MULTIPLE ACCESS/COLLISION DETECTION

[75] Inventor: Jesse B. Lipcon, Harvard, Mass.

[73] Assignee: Digital Equipment Corporation, Maynard, Mass.

[21] Appl. No.: 267,394

[22] Filed: May 26, 1981

[51] Int. Cl.³ .......................... H04B 1/00; H04B 1/40
[52] U.S. Cl. ......................................... 455/58; 455/78; 340/825.5
[58] Field of Search ............................. 455/58, 73, 78; 370/85.93; 375/36; 340/825.5, 825.51; 364/900 MS File

[56] References Cited

U.S. PATENT DOCUMENTS

| | | | |
|---|---|---|---|
| 3,048,764 | 8/1962 | Murphy | 455/78 |
| 3,465,252 | 9/1969 | McLean et al. | 455/78 |
| 3,742,450 | 6/1973 | Weller | 375/36 |
| 4,063,220 | 12/1977 | Metcalfe | 340/825.5 |

Primary Examiner—Jin F. Ng
Attorney, Agent, or Firm—Cesari and McKenna

[57] ABSTRACT

A transceiver for a carrier-sense multiple access communications network using collision detection for controlling access to the network, and utilizing industry standard emitter-coupled logic (ECL) circuits in its receiver and transmitter. The transmitter output stage is an ECL current source. To prevent saturation of the transmitter output in the event of a collision, due to the voltage swing exceeding the compliance limit of the ECL current source, with a resulting failure of the collision detection mechanism, the power supply for the transmitter output stage supplies voltage in a first range of about −5 to −10 volts, while the power supply for the receiver input and collision detection circuits supplies voltage in a second, contiguous range of zero to about −5 volts. This permits the transmitter output to swing about 6–7 volts without exceeding the compliance limit of the current source, so that the collision is detectable by the collision detection circuits.

1 Claim, 10 Drawing Figures

TRANSCEIVER FOR LOCAL NETWORK USING CARRIER-SENSE MULTIPLE ACCESS/COLLISION DETECTION

FIELD OF THE INVENTION

This invention relates to the field of data communications, and, more particularly, to a transceiver for a multi-access communications system which employs carrier-sense multiple access/collision detection techniques for distributed control.

BACKGROUND OF THE INVENTION

In multi-access communication systems, or networks, for interconnecting multiple devices or stations in a communications network, means must be provided for controlling access of the devices to the communications channel. It has previously been proposed to provide a network using a single coaxial cable to interconnect devices for communication with each other. Of course, only one device can transmit at any given time over such a cable, if all devices operate at the same frequency. One form of control which has evolved for such networks is referred to as carrier-sense multiple access with collision detection ("CSMA/CD"). With this technique, each device controls its own access to the coaxial cable channel. Each device which uses the channel interfaces to the cable through a transceiver which includes apparatus for transmitting a signal onto the channel as well as apparatus for receiving a signal from the channel placed thereon by another device's transceiver. The transceivers each include a collision detector for generating a collision signal whenever a signal transmitted on the cable by another transceiver is detected at the same time the transceiver itself is transmitting onto the channel. Each transceiver sends the collision signal back to its host device and in response both hosts stop transmitting. Both then retry transmission after the channel is clear.

Each device that wants to use (i.e., transmit on) the channel, first "listens" to the receiver in its transceiver to hear if any other station is transmitting. If it detects no other host trasmitting, the station starts its transmission, while receiving at the same time. Another station also might start transmitting, though. If that happens, both detect the collision and stop, as noted above. To avoid repeated collisions, each then waits a pseudorandom interval and tries again. On each retry, the pseudorandom delay is increased.

Such a system is illustrated, for example, in U.S. Pat. No. 4,063,220, issued Dec. 13, 1977 to Robert M. Metcalfe et al.

In such CSMA/CD networks, care must be taken to ensure that the failure of one transceiver or one host device does not impair the usability of the network by other stations. Several transceiver failure modes can be foreseen as "bringing down" the network. For example, if a transceiver cannot properly detect collisions, it must not be used to transmit. Similarly, care must be taken to assure that a transmitter or host does not monopolize the channel. Further, since a short circuit in a transmitter or receiver could short out the cable, transceivers must be properly isolated from the coaxial cable.

Accordingly, it is an object of the present invention to provide an improved transceiver for use in such networks, with greatly enhanced reliability and protection against recognizable failure modes which would adversely affect the network.

It is a further object of the invention to provide a transceiver having integral means for simulating collisions to test the collision detection mechanism in its receiver, to insure its proper operation.

Yet another object of the invention is to provide a transceiver whose transmitter and receiver are isolated from the coaxial cable, to protect against transceiver short circuits shorting out the cable.

Still another object of the invention is to provide a transceiver including means for disconnecting the transmitter from the channel in the event the host or transmitter will not stop transmitting.

A further object of the invention is to provide a transceiver using industry standard emitter-coupled logic to facilitate manufacturing.

These and other, further objects, features and advantages of the present invention will be understood from the following description.

SUMMARY OF THE INVENTION

In accordance with this invention, a transceiver for use with a CSMA/CD system utilizing a coaxial cable channel incorporates circuitry for guarding against the possibility of transceiver failure interfering with network operation. The protection circuitry includes means for isolating the transceiver from the coaxial cable so that short circuits in the transceiver do not short circuit the coaxial cable. It further includes means for testing the collision detection circuits in the transceiver by simulating a collision at the end of every transmission. Guard circuitry also is provided in the transceiver's transmitter, to prevent the transmitter from becoming stuck on and monopolizing the coaxial cable channel. The guard circuitry includes a timer which turns on switches to short out the transmitter output a predetermined time after the start of each transmission.

To facilitate assembly and reduce cost, the transceiver is implemented in emitter-coupled logic. This, however, creates compliance problems for the current source which the transmitter uses as a cable driver. Emitter-coupled logic (ECL) generally requires a $-5$ volt power supply. When a current source is made from ECL, there is a limit to how low the output voltage can be pulled before the circuit becomes a voltage source instead of a current source. This point is referred to as the compliance limit of the source. Typically, an ECL current source has a two and one-half volt compliance limit relative to the supply voltage; that is, it cannot be pulled down more than two and a half volts before it will cease to behave as a current source. In a CSMA/CD system, that creates a problem since the transmitter output must be able to swing about 6–7 volts due to the presence of a collision and the voltage drop across the transmitter output isolation circuit. Conventional circuit design wisdom most likely would suggest that emitter-coupled logic could not be used, in view of this problem. Operation of the ECL current source between $-5.2$ and $-10.2$ volts, rather than the conventional range of 0 to $-5$ volts, however, solves this problem, when the receiver input circuitry and the collision detect circuitry are operated on the $-5.2$ volt supply.

Another way to state the problem is that this arrangement provides a means to ensure that the output current source does not saturate when transmitting into the cable at the same time as another transmitter's signal is present. If it did, the collision would not be detected, as the cable voltage would not be lowered enough to trigger collision detection.

A further feature ot the invention is that the current source generates a staircase waveform instead of an abrupt transition when changing logical states. This reduces the high frequency components in the transmitter's oputput and therefore reduces the size of the filter capacitors needed, thereby minimizing phase distortion of the zero-crossings.

This invention is pointed out with particularity in the appended claims. A more thorough understanding of the above and further objects and advantages of this invention may be obtained by referring to the following detailed description, which should be read in conjunction with the accompanying drawings.

DETAILED DESCRIPTION OF AN ILLUSTRATED EMBODIMENT

Figure 1:
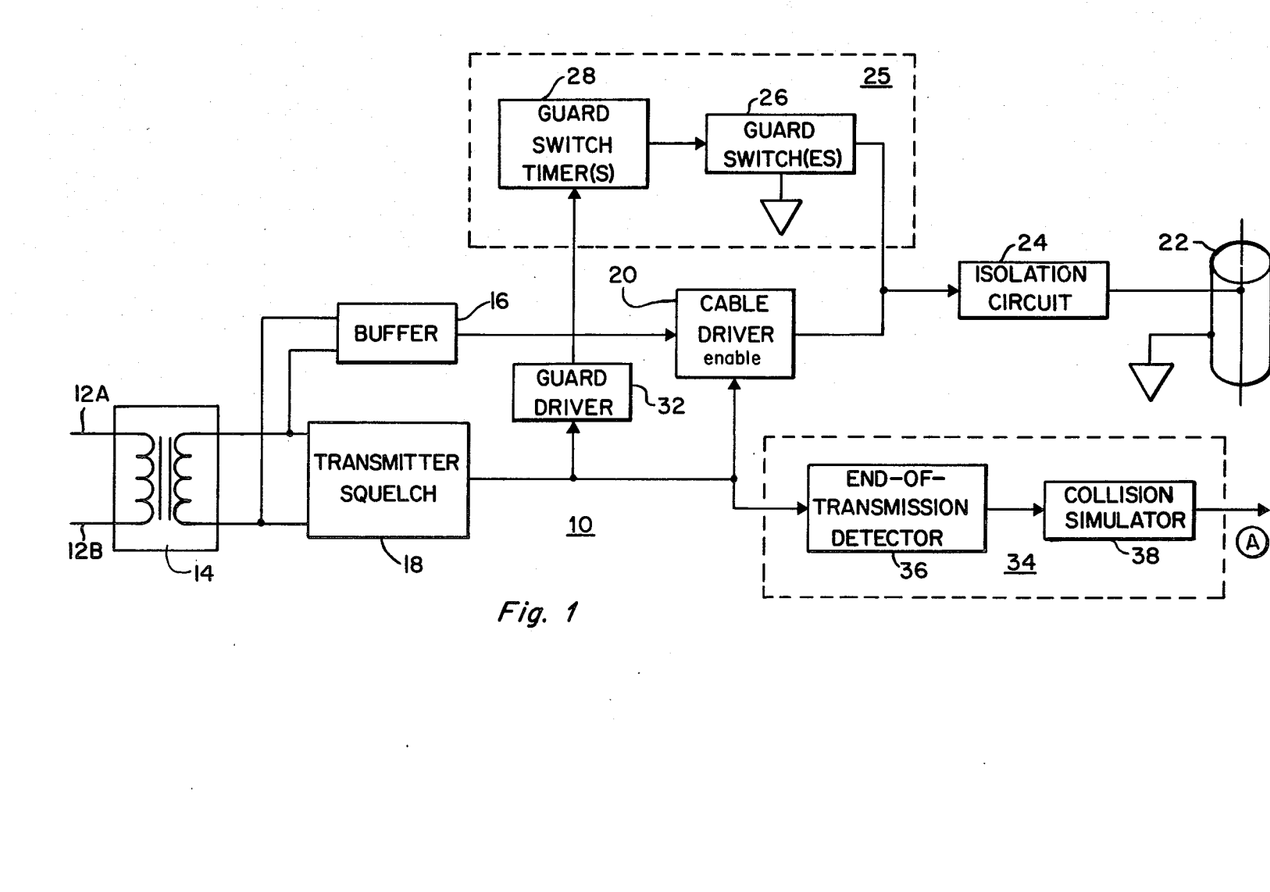
FIG. 1 is a block diagram of the transmitter portion of the transceiver of the present invention.

Referring now to FIG. 1, there is shown a block diagram of the transmitter portion of the transceiver of the present invention. The computer or other host device (not shown) which communicates via the transceiver supplies information to be transmitted over lines 12A and 12B to the primary winding of an input transformer 14. The secondary winding of transformer 14 feeds a buffer amplifier 16 and a transmitter squelch circuit 18. Buffer 16, in turn, feeds a cable driver circuit 20.

The cable driver 20 is a current source which generates the transmit signal applied to the coaxial cable 22 through an isolation circuit 24.

The transmitter squelch circuit 18 monitors the secondary winding of transformer 14 to determine whether the host is sending any signal for transmission. When no signal is being supplied, transmitter squelch 18 disables cable driver 20 so that no spurious information will be transmitted.

Isolation circuit 24 prevents a short circuit in the transmitter from shorting out the cable. As will be apparent from the discussion below, other circuitry in the transceiver intentionally may short out the transmitter or a component failure may do so.

To protect against the possibility of either the cable driver 20 or the host getting stuck on in an active, transmitting mode (which would, of course, prevent other transceivers from gaining access to the cable 22), one or more guards circuits 25 are placed across the output of cable driver 20. The purpose of guard circuits 25 is to short circuit the output of cable driver 20 after the time allotted for a transmission packet, so that the transmitter does not continue to transmit into the network.

Although a single guard circuit should be adequate, multiple guard circuits may be employed for redundancy and high reliability. If more than one guard circuit is used, are all wired in parallel.

Each guard circuit includes a guard switch 26 and a guard switch timer 28. Each guard switch is separately controlled by an individual guard switch timer 28; all of the guard switch timers, however, are controlled by a single guard driver circuit 32.

The rules of such a network (i.e., its communications protocol) normally define a maximum transmission packet length, at least partially for the purpose of insuring that one user does not monopolize the channel. If the host device at a particular station violates this rule for some reason, or the cable driver sticks on and transmits noise or a d.c. level after the host has stopped supplying a message, guard switch timers 28 and guard switches 26 provide a means for disconnecting the involved transceiver from the network so that other users are not unduly inconvenienced. This isolates the problem to the station which has caused it. To this end, guard driver 32 uses the transmitter squelch signal as an indicator of transmitter activity and starts the guard switch timers running at the start of each transmission. After the time defined by the guard switch timers 28, the guard switches 26 are turned on, shorting the output current of cable driver 20 to ground and thus effectively removing the transmitter from the network.

Figure 2:
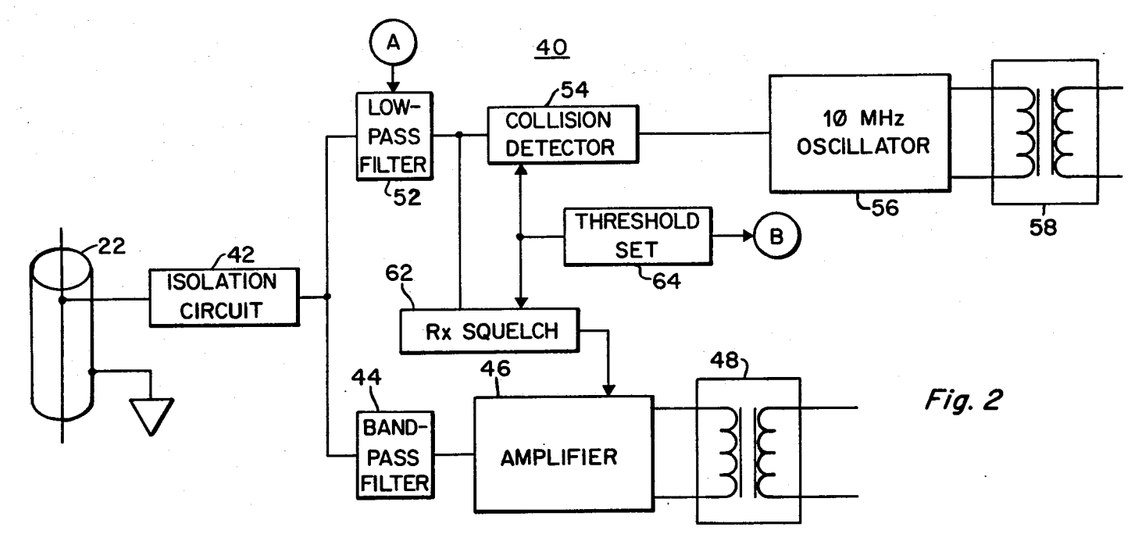
FIG. 2 is a block diagram of the receiver portion of the transceiver of the present invention.

The transceiver is further provided with circuitry for testing its collision detection circuitry. This is done by a collision detector test mechanism 34. The collision detector test mechanism functionally comprises an end-of-transmission detector 36 and a collision simulator 38. The end-of-transmission detector 36 monitors the transmitter squelch signal for a change of state indicating the termination of a transmission, at which time it actuates the collision simulator 38. The collision simulator feeds a signal into the receiver section of the transceiver (at point A, as indicated in FIG. 2). If the collision detection circuitry in the receiver is operating properly, it will signal a collision to the host device. Due to the timing of the collision signal relative to the end of the transmission, the host computer knows to recognize it as a validation of the test. Conversely, it knows that if the collision signal does not appear, the test was failed and the transceiver should not be used for transmision until it is repaired.

The receiver section of the transceiver is illustrated in FIG. 2, in block diagram form. As shown there, the receiver 40 interfaces with the network cable 22 through an isolation circuit 42. There are two signal processing paths in the receiver, both fed from the output of the isolation circuit 42. The first path includes a band pass filter 44, an amplifier 46 and an output transformer 48. The second path includes a low-pass filter 52, a collision detector 54 and a 10 MHz oscillator 56 which is controlled by the collision detector 54 to signal collision detection. The output of the oscillator 56 feeds a transformer 58 through which it signals the host. (All signals to or from the host must be transformer-coupled due to the need for electrical isolation among hosts.) A receiver squelch circuit 62 interconnects the two paths, and gates on the receiver only in the presence of a valid signal.

Low-pass filter (LPF) 52 time-averages the received signal, to provide a d.c. signal indicative of whether information is being transmitted on the cable 22. The output of the collision simulator 38, since it mimics the presence of more than one transmitter signal on the line, is supplied as a second input to LPF 52. Collision detector 54 is a threshold detector which monitors the output of low pass filter 52. If the LPF output exceeds a predetermined threshold, corresponding to the presence of more than one active transmitter, a collision is indicated and the 10 MHz oscillator 56 is then turned on to signal collision detection.

Receiver squelch circuit 62 also responds to the output of LPF 52 by providing a squelch signal to amplifier 46. The squelch signal turns off amplifier 46 when the output of the LPF 52 is so low as to indicate that no signal is being received.

It will be appreciated that the proper operation of collision detector 54 and receiver squelch circuit 62 require the use of stable, accurate thresholds. They are provided by a threshold setting network 64. In addition to the threshold voltages supplied to the collision detector and receiver squelch, the threshold setting network 64 also provides a feedback signal (at point B) whose value is proportional to the threshold signal. This feedback signal is sensed by a comparison amplifier 72 in the power supply 70 (shown in FIG. 3), to control one of the two power supply output voltages.

Figure 3:
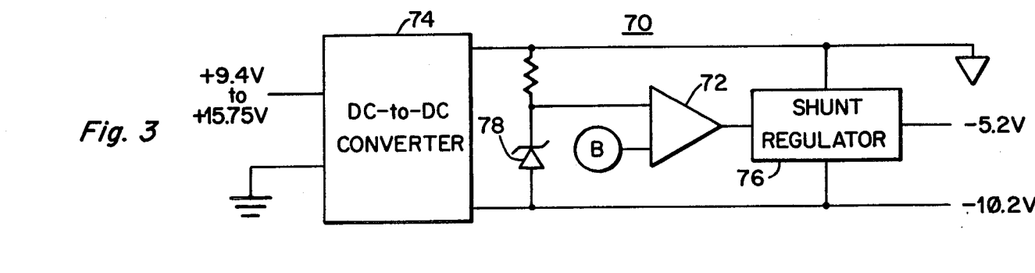
FIG. 3 is a block diagram of the power supply for the transceiver of the present invention.

Power supply 70, in FIG. 3, employs a d.c.-to-d.c. converter 74 to generate a $-10.2$ volt d.c. supply from a host power supply of $+9.4$ to $+15.75$ volts. In addition, a shunt regulator 76 provides a $-5.2$ volt supply derived from the $-10.2$ volt source. The shunt regulator 76 is controlled by a comparison amplifier 72 which compares a voltage established by zener diode 78 with the feedback voltage generated at point B in the threshold setting network 64 of FIG. 2. Thus, the actual output level of the nominally $-5.2$ volt supply is adjusted and regulated so as to maintain the feedback voltage at point B equal to the voltage established by zener diode 78. Consequently, the output of regulator 76 may be greater or less than $-5.2$ volts, as required to provide precision setting of the threshold by the threshold setting network 64.

Figure 4:
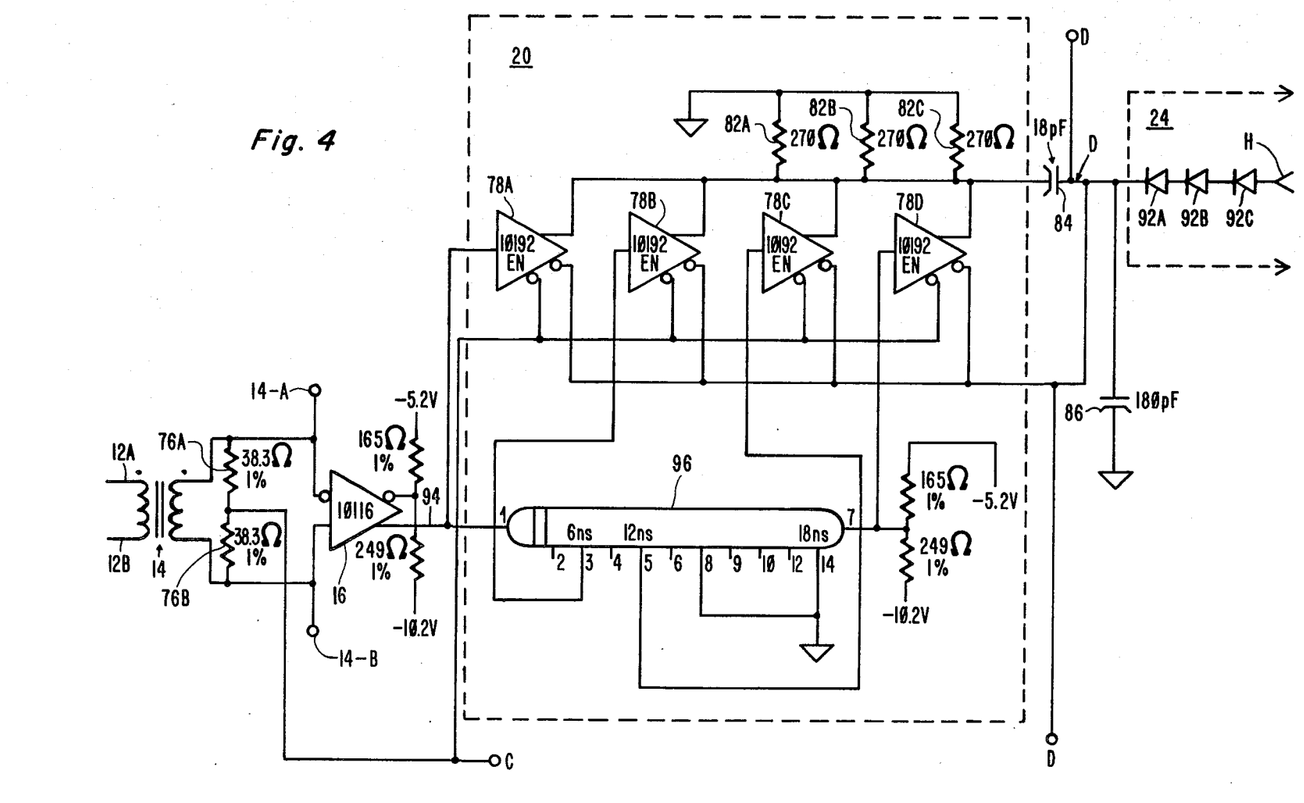
FIG. 4 is a schematic circuit diagram of the signal-generating portion of the transmitter of FIG. 1.

FIG. 4 shows the basic circuitry for the transmitter of the transceiver. The signal to be transmitted is applied to the primary winding (i.e., leads 12A and 12B) of a transformer 14. The secondary winding of transformer 14 provides the input of a buffer amplifier, or line receiver 16. A pair of matched resistors 76A and 76B are also connected in series across the secondary winding of transformer 14, for impedance matching. A center tap is provided at the junction of the two resistors 76A and 76B, and is labelled point C. Point C is connected to a similarly labelled point on FIG. 6, at the output of the squelch circuit. The non-inverting output of buffer amplifier 16, on line 94, provides the signal input to the cable driver 20.

Cable driver 20 is a current source which may be turned on and off to drive the coax cable channel with a binary waveform. The output from cable driver 20, however, is not simply a square wave type of output. It has been found desirable to provide a staircase ramp rather than an abrupt leading and falling edge transition. Thus, from a square wave input, the cable driver 20 generates a well-controlled symmetric trapezoid waveform, through a two-pole RC network which gives a 25 ns rise-time. This gets rid of much of the high frequency energy in the binary waveform without phase-distorting the zero crossings. If a square wave had been used, rather than a staircase, larger filter capacitors would have been needed, thus causing unacceptable phase distortion.

In the exemplary embodiment in FIG. 4, cable driver 20 is implemented with four stages, 78A–78D, providing four steps to the rising and falling staircase. Of course, a different number of steps also can be employed; the number of stages to be used is at the designer's discretion, and four has simply been found convenient. Each of the stages is a differential current switch having a signal input, non-inverted and inverted outputs, and a control (i.e., enable/disable) input. Except for the signal inputs, the current switches 78A–78D are connected in parallel, with like terminals connected to each other. Their non-inverted outputs are all connected to a resistors 82A–82C, which connect to ground, and to one lead of a first filter capacitor 84. The inverted outputs of current switches 78A–78D are connected to the other lead of capacitor 84, which connection also provides the cable driver output, at point (or node) D. There are four other connections to node D, as well: (1) a second filter capacitor 86, connected between node D and the transceiver ground; (2) a series string of three diodes 92A–92C connected between node D and the coaxial cable, comprising isolation circuit 24; (3) guard switches 26, connected from node D to ground; and (4) a transmit bias current switch, shown in FIG. 6.

Figure 6:
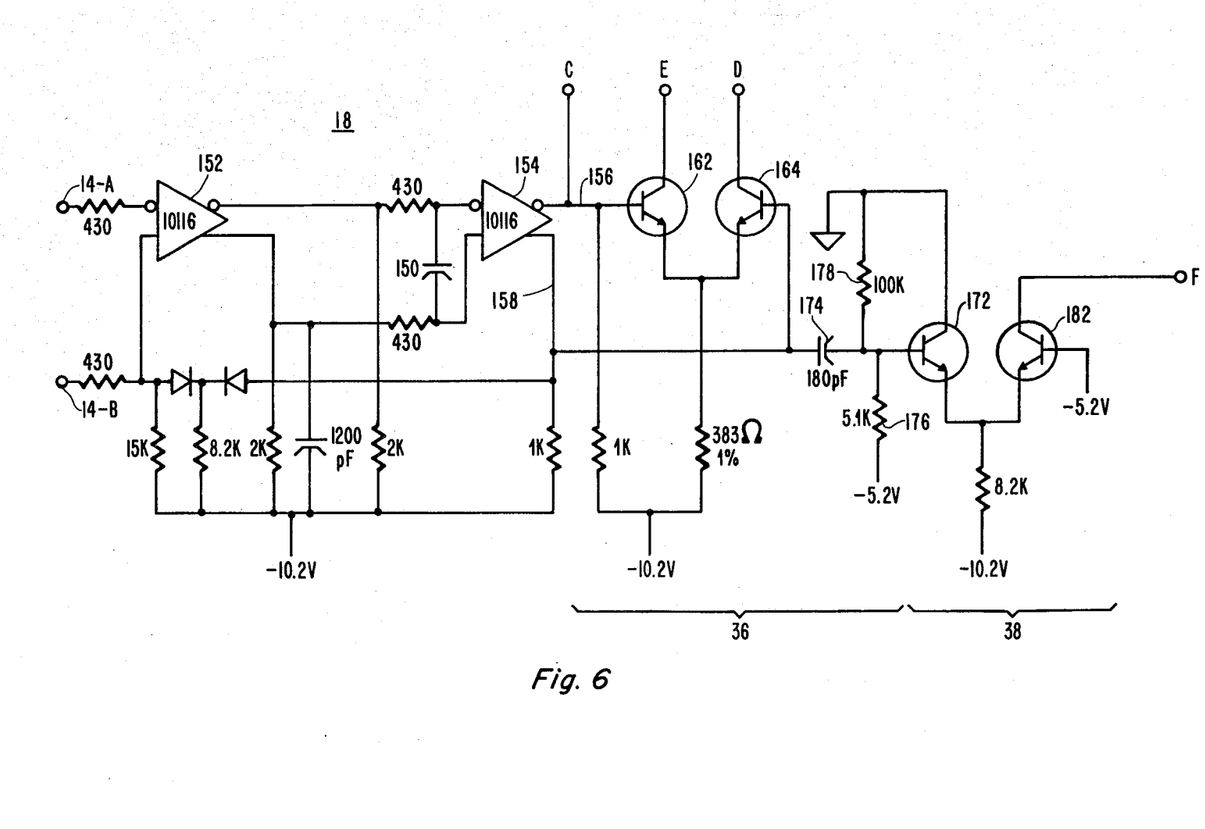
FIG. 6 is a schematic circuit diagram of the transmitter squelch, end-of-transmission detector and collision-detect simulator blocks of FIG. 1.

The enable/disable terminals of the current switches 78A–78D receive an enable/disable signal at point C, from the transmitter squelch circuit of FIG. 6.

In isolation circuit 24, three diodes are connected in series to protect against the possibility of one, or even two diodes short circuiting. Should point D be grounded, diodes 92A–92C become back-biased (open circuits) during other hosts' transmissions, thereby isolating the transmitter from the network. Conversely, the sole result of an open diode is to cause single station failure, while leaving the network intact. The isolation network provides important protection, because the transceiver is direct coupled to the network cable.

The operation of cable driver 20, when enabled, is as follows: A transition from zero to one on line 94, the asserted output of buffer 16, turns on current switch 78A (the first stage of the ramp generator) and also is supplied to the input of a delay line 96 and begins to propagate therethrough. Delay line 96 is tapped three times at, for example, 6 nanoseconds, 12 nanoseconds and 18 nanoseconds of delay. The 6 nanosecond delay provides the input to the second stage current switch 78B, to turn it on 6 nanoseconds after current switch 78A was turned on. Similarly, the 12 nanosecond tap is connected to the input of third stage 78C and the 18 nanosecond output drives the fourth stage 78D. Because the current switches 78A–78D are connected in parallel and draw current through the same load, they provide additive outputs, with the amplitude of the output signal increasing each time another one of those switches is turned on in their machine-gun firing sequence, thereby providing the staircase signal. Resistors 82A–82C and capacitors 84 and 86 provide a two-pole RC filter for smoothing the output signal.

Figure 5:
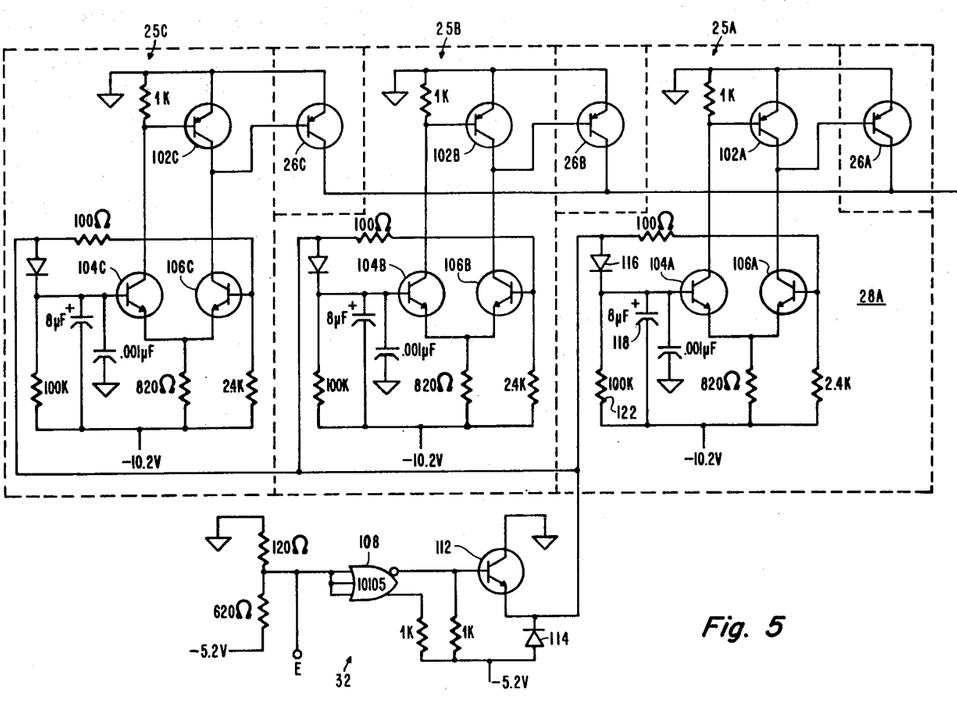
FIG. 5 is a schematic circuit diagram of the guard circuitry 25 of FIG. 1.

Referring now to FIG. 5, guard circuits 25A–25C for shorting the output of the cable driver 20 are shown. The guard circuits comprise a plurality of switches 26A–26C connected in parallel, each having one terminal connecting to the transceiver ground and the other terminal connected to node D. The switches are all controlled by a common driver 32 (gate 108 and transistor 112); and the driver is operated by a signal supplied at point E, which indicates the start of each transmission.

In the exemplary embodiment, the transceiver uses three guard circuits 25A, 25B and 25C, connected in parallel. The guard circuits are identical to one another. The number of guard circuits employed is at the designer's discretion, since multiple guard circuits merely provide redundant protection and reduce the statistical probabilty of functional failure in the transceiver which "brings the network down." When three guard circuits are employed, of course, the chances of them all being out of commission is much lower than the chance for one guard circuit alone being out of commission.

Since all of the guard circuits are identical, only guard circuit 25A will be explained in detail, it being understood that the same explanation applies with respect to the other guard circuits.

Guard circuit 25A comprises a guard switch 26A and a guard switch timer 28A, which includes transistors 102A, 104A and 106A, plus their associated components. Guard switch transistor 26A is connected as a simple common emitter switch with its emitter attached to the transceiver ground and its collector attached to the node D of FIG. 4. When actuated, the switch transistor 26A shorts out node D to ground. It is open only when there is a valid signal to transmit. A guard circuit driver comprising OR/NOR gate 108 and transistor 112 controls the operation of guard switch timer 28A.

A "stuck on" current switch 78A–78D will draw current from the guard switch(es) rather than the network.

When the signal at connection point E from the transmitter squelch circuit of FIG. 6 changes state to indicate the beginning of a transmission (i.e., it goes high), transistor 112 emitter goes low and diode 116 becomes back biased, allowing resistor 122 to discharge capacitor 118. Resistor 122 controls the rate at which capacitor 118 discharges. When capacitor 118 is discharged sufficiently, the voltage across it turns off transistor 104A. Transistors 104A and 106A are an emitter-coupled pair, so when transistor 104A turns off, transistor 106A turns on, activating switch 26A and driving transistor 26A into saturation. Thus, a predetermined time after the beginning of a "stuck" transmission, all of the guard switches are turned on, shorting the output of cable driver 20 and effectively disconnecting it from the cable. At the end of an "unstuck" transmission, transistor 112's emitter goes high, turning switch 26A on, also recharging capacitor 118 via diode 116 in preparation for a subsequent transmission.

Turning now to FIG. 6, there is shown the remainder of the transmitter circuitry, including squelch and other control circuits.

Amplifiers 152 and 154 plus the associated componentry form the transmit squelch circuit. This is a conventional type of squelch circuit whose operation will be readily understood from the drawing by those skilled in the art. Accordingly, a detailed explanation is unnecessary to the understanding of this invention. The squelch circuit monitors the transmit signal from the host (which appears across points 14-A and 14-B, the secondary leads of transformer 14) and provides two outputs, the cable driver enable/disable signal which is provided on line 156 (point C) and the complement to that signal which is provided on line 158.

Transistors 162 and 164 comprise an emitter-coupled pair. The base of transistor 162 is driven by the non-asserted output of amplifier 154, on line 156. The collector of transistor 162 supplies an output signal at connection point E, which connects to a similarly labelled point on FIG. 4 to drive the guard circuit driver. The signal at point E is essentially an inverted and level-shifted representation of the signal on line 156.

Transistor 164 is driven at its base by the asserted output of amplifier 154, on line 158. The collector of transistor 164 provides a transmit bias which is connected to point D on FIG. 4. During transmission, transistor 162 is turned off and transistor 164 is turned on.

The signal on line 158 from amplifier 154 also feeds transistor 172 through capacitor 174 and resistors 176 and 178. At the end of a transmission, when the squelch changes state, a spike or pulse approximately one microsecond wide is produced at the emitter of transistor 172 due to the effect of differentiation produced by capacitor 174. This turns on transistor 182 for a like duration and produces a collision test signal at the collector of transistor 182, which is shown as a point F to be connected to a similarly marked point on FIG. 7, in the low-pass filter of the receiver.

The collision test signal simulates the effect of a collision by drawing excess current through the receiver input at the end of every packet transmitted. Transistor 204 isolates the collision test signal from the network, so it is not seen by other stations; only the transmitting station responds to it. Further, this collision test does not suffer from "single point of failure" problem. The host, of course, must check at the end of each transmission for the presence of the "collision signal" generated by the collision test signal.

Figure 7:
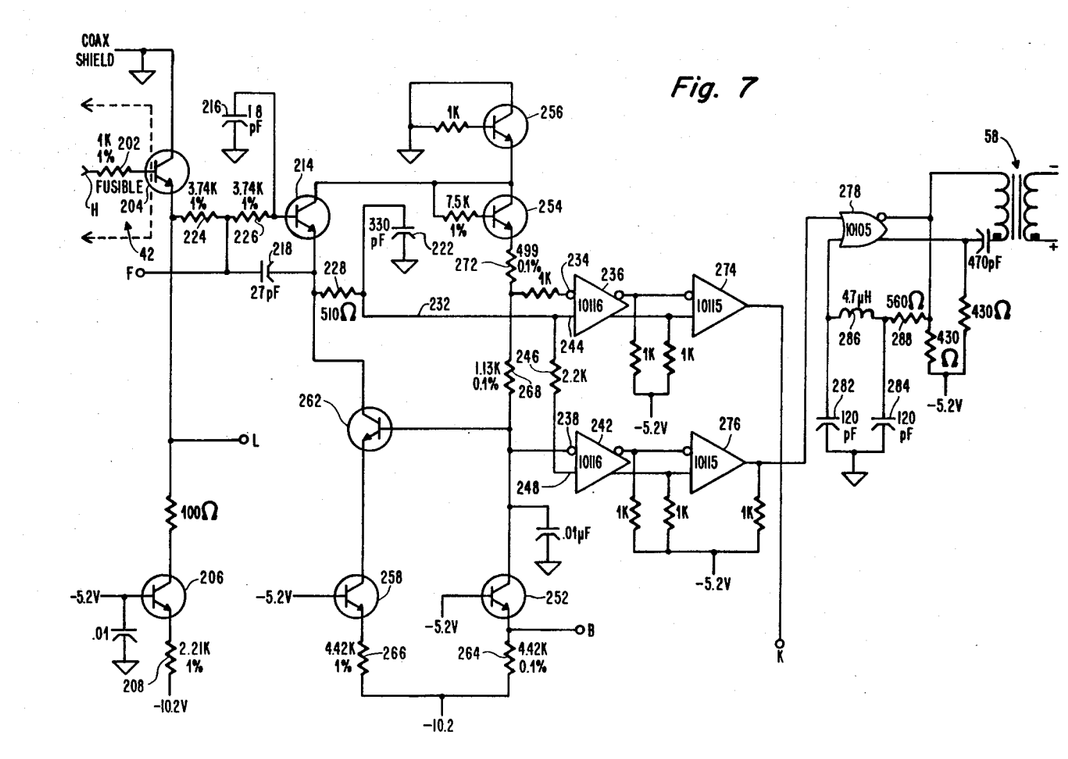
FIG. 7 is a schematic circuit diagram of the collision detect, receive squelch and threshold setting portions of the receiver of FIG. 2.

Attention is now directed to the aforesaid FIG. 7, which illustrates the low-pass filter, receiver squelch, collision detector, collision oscillator and threshold setting circuits. Connection point H is the receiver input from the coaxial cable (and, of course, the transmitter output, as well). It is attached to a fusible resistor 202 which provides protection against a short circuit in transistor 204 having any adverse impact on the network. Transistor 204 is connected as a unity gain emitter-follower. A current source comprised of transistor 206 and resistor 208 biases transistor 204 so that it is always conducting.

Transistor 214 and the associated components (capacitors 216, 218 and 222 plus resistors 224, 226 and 228) provide an emitter-follower circuit configured as a three-pole low-pass filter. The output of the low pass filter, on line 232, represents the average value of the signal on the cable, offset by the base-emitter voltage drops of transistors 204 and 214. The signal on line 232 is compared against two thresholds. One threshold is used to determine whether there is a single signal on the cable (in which event the receiver squelch should be turned off) and another threshold is used to determine whether there are two or more signals on the cable (in which event a collision is indicated). These thresholds are applied, respectively, to the inverting input 234 of a differential line receiver which is used as a comparator 236 and to the inverting input 238 of a similar comparator 242. The signal on line 232 is supplied to the non-inverting input 244 of comparator 236 and, through a resistor 246 to the non-inverting input 248 of comparator 242.

The two thresholds are set by a precision current source comprising transistor 252 plus a compensation circuit comprising transistors 258 and 262. The base of transistor 252 is connected to the −5.2 volt supply and its emitter is connected to the −10.2 volt supply through a resistor 264. Resistor 264 is a high precision resistor; the voltage across it sets the emitter current of transistor 252. The power supply adjusts the precise value of the regulted output (which is nominally −5.2 volts) to achieve the desired current through resistor 264. To this end, the voltage at the emitter of transistor 252 is sensed by the power supply and a connection to the power supply is shown at a point labelled B. Transistor 258 is connected as a similar current source with an emitter resistor 266 having the same value as resistor 264, to produce the same emitter current.

Transistor 262 is the load for current source 258 and its sole purpose is to draw a base current into transistor 262 which will raise the current drawn through resistors 268 and 272 by an amount which very nearly equals the difference between the collector current and emitter current of transistor 252. Thus, transistor 262 is intended to compensate for the fact that transistor 252 has a finite current gain as a result of which its collector current does not exactly equal its emitter current, by pulling a current through resistors 268 and 272 which is very close to the emitter current through resistor 264.

Preferably, transistor 252 and 262 will be provided on the same substrate so as to provide matching current gain, and thereby set the current in resistors 268 and 272 exactly equal to the emitter current of transistor 252. The actual threshold voltages are developed across resistors 268 and 272 plus the sum of the base-emitter drops across transistors 254 and 156. Transistors 254 and 256 are used to match the corresponding base-emitter drops of transistors 214 and 204.

Preferably, transistors 256 and 204 will be provided on the same substrate so that their base-emitter voltage drops will match and transistors 254 and 214 will also be provided on the same substrate, for the same reason.

The signal provided on line 232, to be compared with the reference thresholds, is produced by filtering the sum of the signal received over the coaxial cable and the collision simulation test signal supplied at point F.

Figure 8:
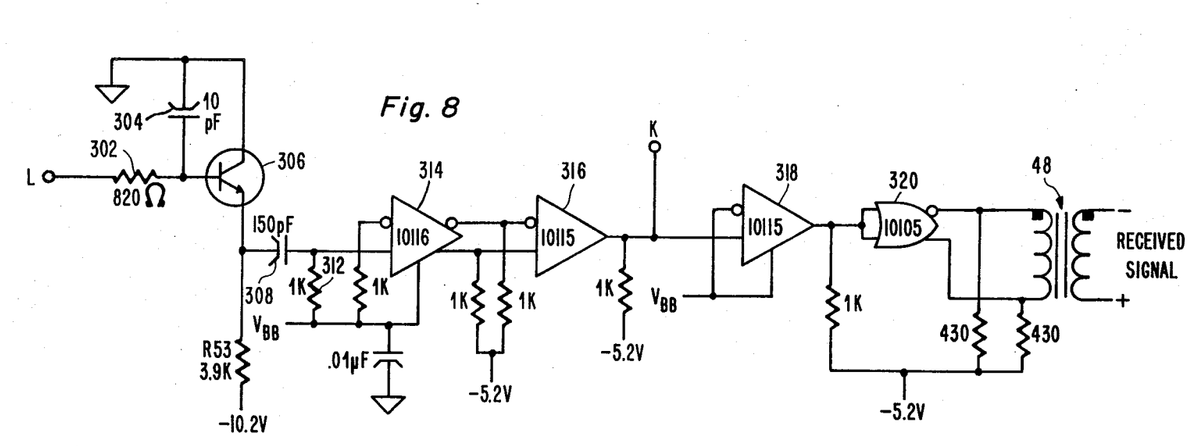
FIG. 8 is a schematic circuit diagram of the band-pass filter and amplifier portions of the receiver of FIG. 2.

The comparator 236 drives a buffer amplifier 274, the output of which provides the receiver squelch signal at point K, which is connected to the similarly labelled point in FIG. 8.

The comparator 242 detects whether the collision threshold has been exceeded. In turn, it drives a buffer amplifier 276 which turns on and off a 10 MHz oscillator formed by OR/NOR gate 278, capacitors 282 and 284, inductor 286 and resistor 288. The OR/NOR gate 278 provides a balanced output for driving a transformer 292 through which a collision presence signal is supplied to the host device.

Turning now to FIG. 8, the receiver circuitry will be explained in detail. The receiver gets its input at point L, the emitter of transistor 204 in FIG. 7. Resistor 302 and capacitor 304 filter out the high frequency components in the received signal. Transistor 306 is an emitter follower which acts as a buffer and provides a low impedance output to drive a high pass filter comprising capacitor 308 and resistor 312, on the non-inverting input of a differential line receiver amplifier 314.

The output of amplifier 314 feeds another buffer amplifier stage 316. The receiver squelch signal from amplifier 274 (connection point K) is also connected to the output of buffer amplifier 316. Since this is emitter-coupled logic, if the output of either amplifier 274 or amplifier 316 is high, then their common connection (point K) is high. Thus, the output of amplifier 316 is squelched, or turned off, by maintaining the output of amplifier 274 high.

The output of amplifier 316 also feeds the non-inverting input of another amplifier stage 318, which then feeds an OR/NOR gate 320. Gate 320 provides gain and also presents a balanced differential output signal to drive a transformer 322 through which the receive signal is communicated to the host device.

Figure 9:
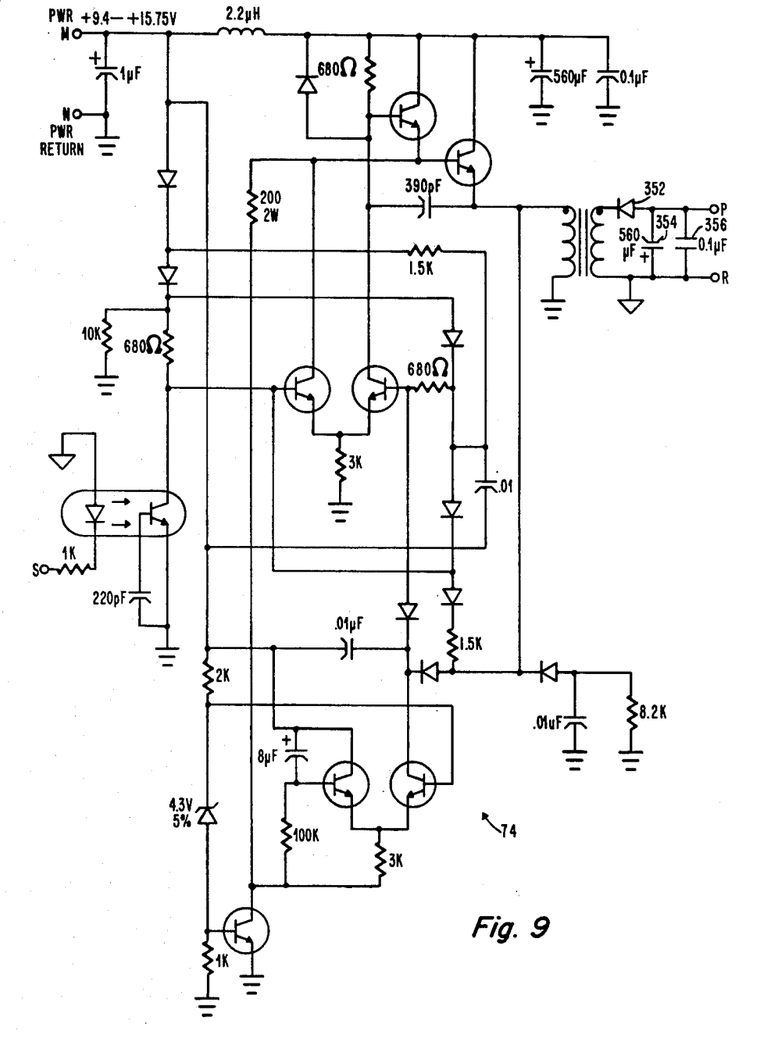
FIG. 9 is a schematic circuit diagram of the d.c.-to-d.c. converter of FIG. 3.
Figure 10:
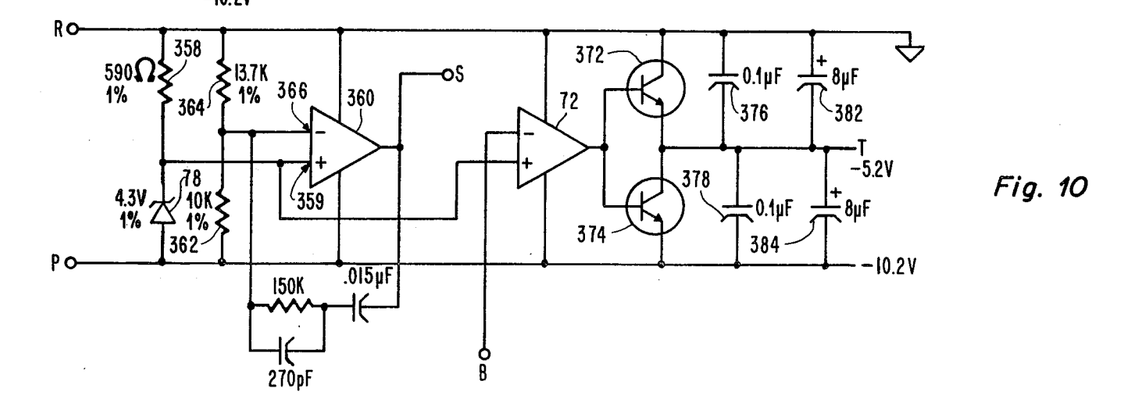
FIG. 10 is a schematic circuit diagram of the power supply regulator of FIG. 3.

In FIG. 9, circuitry is provided for a d.c.-to-d.c. converter useful in the power supply of the present invention for converting +9.4 to +15.75 volt power from the host or other source to −10.2 volts. The details of the d.c.-to-d.c. converter are unimportant in terms of understanding the present invention; other converter circuits could be employed just as well and the design of power supplies, including the design of such converters, is well-developed in the electrical arts. Thus, for purposes of this explanation, it is sufficient to note that the d.c.-to-d.c. converter 74 receives a positive voltage at terminal M relative to an input power return, or ground, at terminal N and that it supplies an unregulated output voltage at a terminal P relative to an isolated transceiver ground at terminal R. A co-operating voltage regulator shown in FIG. 10, is connected to terminals P and R. This voltage regulator also supplies a feedback signal to a point S in the converter, responsive to which the d.c.-to-d.c. converter adjusts its output voltage.

Turning now to FIG. 10, the regulator circuitry is shown for taking the unregulated voltage supplied at terminal P and providing regulated outputs of −10.2 and −5.2 volts.

A 4.3 volt zener diode 78 is connected across the 10.2 volt supply through a series 590 ohm resistor 358, to provide a precise reference point 4.3 volts above (i.e., more positive than) the nominally −10.2 volt supply, at the non-inverting input 359 of operational amplifier 360. A precision resistive divider network 362 and 364 is designed to provide 4.3 volts at the inverting input 366 of amplifier 360 when the voltage across terminals point R is precisely 10.2 volts. The output of amplifier 360 provides a feedback signal to the d.c.-to-d.c. converter 74, at point S. The feedback signal supplied to point S represents the error between the 4.3 volt reference provided by zener diode 78 and the voltage measured at the inverting input of amplifier 360, and, thus, the amount by which the voltage at terminals P, R differs from 10.2 volts. The d.c.-to-d.c. converter 74 responds to the feedback signal at point S by adjusting its output so as to eliminate any error signal.

The 4.3 volt signal across zener diode 78 is also applied to the non-inverting input of comparison amplifier 72, as a reference for the −5.2 volt supply. Unlike the −10.2 volt supply, however, the output of the −5.2 volt supply is not forced to bear a definite relationship to the zener diode voltage. Rather, a particular point in the threshold circuit (powered from the −5.2 volt supply) is forced to have a definite relationship to that voltage. The inverting input of amplifier 72 receives the signal generated at point B of FIG. 7, the current source for the threshold-setting network. The output of amplifier 72 controls a shunt regulator comprised of transistors 372 and 374, as well as capacitors 376, 378, 382 and 384, to provide a regulated −5.2 volt output at point T. The resulting precise regulation is at point B, where it has direct effect on the precision of threshold-setting.

Amplifier 72 senses a point remote to the power supply itself, where a specific voltage (equal to the zener diode voltage) should appear; it compares the sensed voltage with the reference voltage established by the zener diode and drives the shunt regulator output to force the remote, monitored voltage to equal the reference voltage. Any deviation between the two produces an error signal which causes either transistor 372 or 374 to be driven harder, thus shifting the electrical position of their emitter connections relative to the 10.2 volt supply.

This circuit thus permits a single zener diode reference to be used to regulate two different supply voltages, one in the power supply and the other in one of the circuits powered by the supply.

Having thus described the invention, it will be apparent that various modifications, alterations, and improvements will readily occur to those skilled in the art. Accordingly, it is intended that such alterations, modifications and improvements as are obvious herefrom be included within the scope of this invention. The invention is intended to be limited only as defined in the appended claims, the foregoing description being illustrative only, and not limiting.

Having illustrated and described my invention, I claim:

1. In a transceiver for a station of a carrier-sense multiple access network with network access controlled by collision detection, wherein the transceiver includes a transmitter and a receiver, the transmitter includes a current source output stage, the receiver includes collision detection means for detecting the presence of two or more stations in the network transmitting simultaneously, and the transmitter current source and receiver collision detection means are coupled via a coaxial cable which provides a communications channel for the network, the improvement comprising:

the transmitter current source being constructed of emitter-coupled logic which requires d.c. power within a first, specified voltage range and an output voltage not exceeding a level at which the current source circuitry becomes a voltage source, such level being termed the compliance limit of the current source;

the receiver's collision detection means requiring d.c. power within a second voltage range;

first power supply means for supplying voltage within the first range;

second power supply means for supplying voltage within the second range;

the first range extending between a first voltage and a second voltage;

the second range extending between said second voltage and a third voltage; and the third voltage also being the voltage on the coaxial cable with no signal imposed thereon;

whereby the voltage swing at the output of the transmitter current source can extend from the third voltage to the compliance limit of the transmitter current source, which is in the first range, in the event of a collision between two or more transmitters, thereby preventing saturation of the current source and making the collision condition detectable by the collision detection means.

* * * * *